United States Patent [19]

Semashko et al.

[11] 4,257,865
[45] Mar. 24, 1981

[54] ELECTROCHEMICAL WORKING METHOD AND SYSTEM FOR EFFECTING SAME

[76] Inventors: Andrei P. Semashko, ulitsa Rossiiskaya, 43/2, kv. 4; Nasikh Z. Gimaev, ulitsa 50 let SSSR, 31, kv. 12; Ivan V. Maximov, ulitsa Stepana Zlobina, 41, kv. 61; Sergei V. Bezrukov, ulitsa Kirova, 41, kv. 37; Vladimir B. Rabinovich, ulitsa Stepana Zlobina, 42, kv. 46, all of Ufa, U.S.S.R.

[21] Appl. No.: 105,910

[22] Filed: Dec. 21, 1979

Related U.S. Application Data

[62] Division of Ser. No. 8,580, Feb. 1, 1979, Pat. No. 4,213,834.

[51] Int. Cl.³ ............................ B23P 1/02; B23P 1/14
[52] U.S. Cl. ......................... 204/224 M; 204/129.25; 204/129.5
[58] Field of Search ........... 204/224 M, 129.2, 129.25, 204/129.5, 228, DIG. 9

[56] References Cited

U.S. PATENT DOCUMENTS

| | | | |
|---|---|---|---|
| 3,280,016 | 10/1966 | Bass et al. | 204/129.25 |
| 3,714,005 | 1/1973 | Drushel | 204/129.2 |
| 3,758,739 | 9/1973 | De Jongh et al. | 204/129.25 |
| 3,859,186 | 1/1975 | Ullmann et al. | 204/129.25 X |

FOREIGN PATENT DOCUMENTS

| | | | |
|---|---|---|---|
| 229153 | 10/1968 | U.S.S.R. | 204/129.25 |
| 592561 | 2/1978 | U.S.S.R. | 204/129.25 |

*Primary Examiner*—Howard S. Williams
*Assistant Examiner*—D. R. Valentine
*Attorney, Agent, or Firm*—Lackenbach, Lilling & Siegel

[57] ABSTRACT

The electrochemical working method according to the invention comprises the use of two electrodes whereof one oscillates with respect to the other. Voltage pulses are applied to the electrodes in synchronization with the oscillation and are continued to be applied thereto when the electrodes are found at a minimum distance from one the other. As the electrodes are brought apart, cavitation is produced in the interelectrode gap, which phenomenon is accompanied by a change in the relative resistance of the gap. A cavitation transducer is used to measure a parameter which unambiguously determines the cavitation intensity corresponding to a preset minimum gap. In order to control the electrochemical treatment process, a comparator produces a signal equal to the difference between a signal corresponding to the actual relative value of the parameter function and formed by a computing unit, and a signal corresponding to a predetermined value of the parameter. The output signal of the comparator is used to control the width of the interelectrode gap and the pressure at its inlet, whereby one can effectively maintain the cavitation parameter and the relative resistance of the gap at a desired level.

6 Claims, 14 Drawing Figures

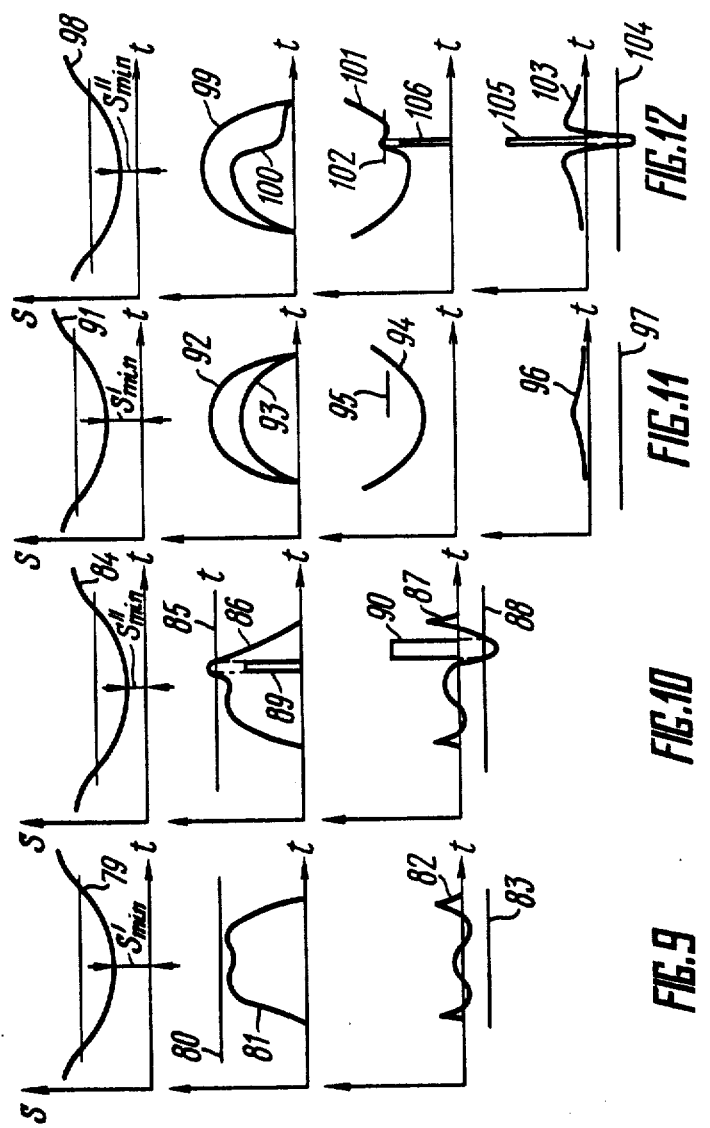

ELECTROCHEMICAL WORKING METHOD AND SYSTEM FOR EFFECTING SAME

This is a division of application Ser. No. 8,580, filed Feb. 1, 1979, now U.S. Pat. No. 4,213,834.

FIELD OF THE INVENTION

The present invention relates to the precision electrochemical working of metals and alloys and, more particularly, to an electrochemical working method and a system for effecting same.

The invention is applicable to the copying and broaching of workpieces of churlish materials.

BACKGROUND OF THE INVENTION

There are known methods for electrochemical working of metals, involving forced oscillation of one of the two electrodes used for the purpose. As the electrodes are brought closer together, synchronized voltage pulses are applied thereto; however, the application of pulses is discontinued when the distance between the electrodes is brought to a minimum. The cutoff of voltage at this point significantly affects the rate and accuracy of copying operations.

There is further known an electrochemical working method involving forced oscillation of one electrode which is synchronized with the application of voltage pulses. The on-off time ratio is varied in the course of the process, being low at the start and increasing towards the end of the working. The pulses are shifted in time so as to reduce instantaneous widths of the interelectrode gap at which the gap conducts current. Voltage pulses can be applied to the electrodes both when they are drawn close to each other and when they are brought apart. However, no voltage pulse is applied with the electrodes being at a minimum distance from one the other. The control of the process conditions by shifting pulses in time and varying the on-off time ratio is disadvatageous in that it reduces the accuracy of the working, especially in cases of broaching vertical walls.

Generally, the conventional electrochemical working methods are disadvantageous in a broad range of variations in the width of the interelectrode gap. The application of voltage pulses under such conditions is tantamount to applying them with a large mean gap width and substantially affects the accuracy of copying the tool electrode on the surface being worked.

There is further known a method for controlling the width of the interelectrode gap in the course of electrochemical working which involves forced oscillation of one of the electrodes, synchronized with the application of voltage pulses to said electrodes (cf. USSR Inventor's Certificate No 187,125, Cl. 2G 05 d 3/00). According to this method, additional low-voltage current is applied to the electrodes, and the interelectrode gap width is controlled with reference to surges of this current, caused by short-circuiting of the electrodes.

The foregoing technique of controlling the width of the interelectrode gap with reference to surges of current supplied from a low-voltage source, which surges are brought about by a direct contact between the tool electrode and article being worked, rules out the application of working voltage pulses to the electrodes found at a minimum distance from one the other. The idea is to prevent damaging the tool electrode and surface being worked by short-circuiting. In fact, voltage pulses are applied as the tool electrode is on its way to or from the surface being worked, i.e. at a variable width of the interelectrode gap. In most cases, the oscillation amplitude is about 0.2 mm, and the working voltage on-off time ratio is 2 to 3. These figures clearly suggest that the electrochemical dissolution occurs at a large mean gap width, which reduces the accuracy of the working of articles and, especially, of their side planes. Attampts to improve the accuracy by increasing the on-off time ratio to a value as high as 5 to 10, i.e. by reducing the duration of working voltage pulses, lead to significant drops in the feedrate. It should also be kept in mind that voltage is continuously fed to the electrodes by the auxiliary power source so that the contact between them inevitably causes erosion of both the tool electrode and the workpiece. The contact of the electrodes may also lead to mechanical deformation of the tool electrode and the workpiece, especially when working small cavities or blanks of relatively soft materials.

Thus the conventional electrochemical working and interelectrode gap control methods, based on oscillation of one of the electrodes, which is synchronized with voltage pulses, are inadequate in what concerns the accuracy, effectiveness and quality of working articles of comple configurations.

There are known means for electrochemical working, based on the principle of analyzing high-frequency current components which are brought about by all kinds of process disturbances and may cause short-circuiting in the interelectrode gap.

None of such means can be used for pulse-current electrochemical working, because the high-frequency spectrum of the pulse train suppresses useful signals as a result of microbreakdowns of the interelectrode gap.

There are further known means for electrochemical working, involving the use of an oscillating electrode and pulse current, which operate as controllers in the sense that the automatic advance of one electrode towards the other is discontinued as soon as the electrodes come into contact. Working pulse voltage can only be applied to the electrodes in the process of bringing them closer together or apart, i.e. under the conditions when the interelectrode width is variable within a broad range. Clearly, this seriously affects the rate and accuracy of copying operations.

SUMMARY OF THE INVENTION

It is an object of the present invention to ensure a high accuracy, efficiency and quality of electrochemical working of articles of hard-to-work current-conducting materials, involving different kinds of copying and broaching operations.

The invention essentially consists in providing a method for electrochemical working, based on forced oscillation of one of the electrodes, synchronized with pulse voltage applied to the electrodes, which is characterized, according to the invention, in that the working process is accompanied by monitoring the variations of the relative resistance of the interelectrode gap, caused by a cavitation as the electrodes are brought apart. The relative resistance is to be understood as the ratio between the time-variable resistance of the interelectrode gap and the resistance of a minimum interelectrode gap with pulses applied to the electrodes found at a minimum distance from one the other. The width of the interelectrode gap and the electrolyte pressure at its inlet are controlled by maintaining a predetermined variation of the relative resistance at a constant level.

The range of variation of the relative resistance, due to cavitation occurring as the electrodes are brought apart, is set by periodically setting a desired interelectrode gap width. Each time this is done, the variation in the resistance is measured and recorded. The recorded value is compared between measurements with the time-variable change of the relative resistance.

The accuracy of monitoring the change in the relative resistance due to cavitation as the electrodes are brought apart is improved by measuring its second component with time.

In case of using a power source operating over the dropping portion of the volt-ampere characteristic, which is meant to ensure a simple and reliable control of the process, the change in the relative resistance due to cavitation as the electrodes are brought apart is monitored by measuring the change of the relative voltage across the electrodes, which is a ratio between the actual voltage and voltage observed at a minimum width of the interelectrode gap.

In addition, one can measure the second component of voltage across the electrodes so as to improve the sensitivity and expand the range of control with different shapes of pulse voltage.

The invention further consists in providing an electrochemical working system comprising, in accordance with the invention, a cavitation transducer connected to the electrodes and having its output electrically coupled to an input of a working conditions control device. The latter comprises a unit for selecting and storing values of cavitation parameter at a minimum interelectrode gap width, its output being connected to a first input of a unit for calculating the relative value of the cavitation parameter function. A second input of the latter unit and an input of the unit for selecting and storing values of the cavitation parameter at a minimum interelectrode gap width are electrically connected to an output of the cavitation transducer. An output of the unit for calculating the relative value of the cavitation parameter function is connected to an input of a unit for selecting and storing the relative value of the cavitation parameter function and to a first input of a unit for comparing the actual relative value of the cavitation parameter function with a predetermined value, its second input being connected to an output of the unit for selecting and storing the relative value of the cavitation parameter function. The unit for comparing the actual relative value of the cavitation parameter function with a predetermined value is further referred to as the comparator. The comparator has its output connected to an inhibit circuit whose output serves as that of that of the working conditions control device and is connected to an actuator. Control inputs of the unit for selecting and storing the value of the cavitation parameter at a minimum width of the interelectrode gap and of the unit for selecting and storing the relative value of the cavitation parameter function are connected to a time control unit; so is a control input of the inhibit circuit.

It is expedient that the working conditions control unit should include a second-order differentiation unit having its input connected to the cavitation transducer and its output connected to the second input of the unit for calculating the relative value of the cavitation parameter function.

The cavitation transducer may be a voltage sensor.

The cavitation transducer may also be of the type that comprises a voltage sensor and a current sensor having their outputs connected to a unit for calculating the resistance of the interelectrode gap whose output serves as the output of the cavitation transducer.

The method and system for electrochemical working according to the invention account for a high accuracy, efficiency and quality of copying and broaching operations involving articles of churlish materials, which equally applies to the working of articles of complicated shapes and large batches of identical articles.

BRIEF DESCRIPTION OF THE ACCOMPANYING DRAWINGS

Other objects and advantages of the present invention will become more apparent from a consideration of the following detailed description of preferred embodiments thereof, taken in conjunction with the accompanying drawings, wherein:

FIG. 9 is a time plot illustrating variations of the relative voltage across the electrodes and its second component with a large minimum width of the interelectrode gap, in accordance with the invention;

FIG. 10 is a time plot illustrating variations of the relative voltage across the electrodes and its second derivative with a small minimum width of the interelectrode gap, in accordance with the invention;

FIG. 11 is a time plot illustrating variations of the relative resistance of the interelectrode gap and its second derivative with a large minimum width of the interelectrode gap, in accordance with the invention;

FIG. 12 is a time plot illustrating variations of the relative resistance of the interelectrode gap and its second derivative with a small width of the interelectrode gap, in accordance with the invention;

DETAILED DESCRIPTION OF THE INVENTION

Figure 1:
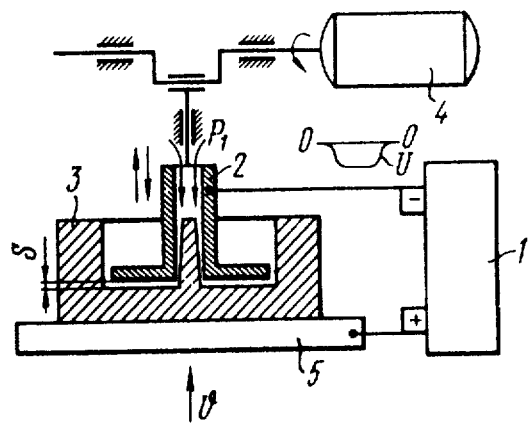
FIG. 1 is a diagram illustrating the way the electrochemical working method according to the invention is carried out.

The method according to the invention is as dollows. Pulses of voltage U are applied from a power source 1 (FIG. 1) to a tool electrode 2 and a second electrode which is a workpiece 3. The tool electrode 2 oscillates in the directions indicated by the arrows. The repetition frequency of the U pulses and the oscillation frequency of the tool electrode 2 are synchronized so that a pulse U is applied at a moment when the tool electrode 2 and workpiece 3 are at a minimum distance from one the other, i.e. when the tool electrode 2 is in its lower position.

The electrochemical working is carried out in a flow of electrolyte. The electrolyte pressure at the inlet of the interelectrode gap S is designated as $P_1$. As the tool electrode 2 approaches the workpiece 3, it is set in high-speed oscillating motion by a motor 4. The workpiece 3 is mounted on a table 5 which moves towards the tool 2 at a speed V. The rapid advance of the tool 2 towards the workpiece 3 results in a rise of the hydrodynamic pressure $P_S$ (FIG. 2) of the electrolyte in the interelectrode gap S. Vapor-gas bubbles 6 contained in the electrolyte and released in the course of the electrochemical process are compressed and dissolved in the electrolyte. Thus the anodic dissolution of the surface of the workpiece 3 (FIG. 1) takes place in a situation when the possibility of a breakdown of the interelectrode gap S is negligible due to the absence of vapor-gas bubbles 6 (FIG. 2). This accounts for a high accuracy, efficiency and quality of the electrochemical working which is carried out with very narrow interelectrode gaps S.

As the tool 2 (FIG. 1) is rapidly brought away from the workpiece 3, the pressure $P_S$ (FIG. 2) falls sharply, which is accompanied by an intensive liberation of the vapor-gas bubbles 6 formerly dissolved in the electrolyte. Thus there begins cavitation caused by the drop of the electrolyte pressure $P_S$ in the interelectrode gap S. The above developments lead to a rapid increase of the resistance R-portion A of the interelectrode gap S. As the gap S widens, it is increasingly washed with fresh electrolyte, which eventually reduces the resistance R-portion B of the interelectrode gap S. Thus as the tool 2 (FIG. 1) is brought away from the workpiece 3, the resistance R (FIG. 2) first rises over the portion A of the interelectrode gap S and then falls over the portion B of that gap. Hence, there is a local extremum of the variation of the resistance R.

Figure 2:
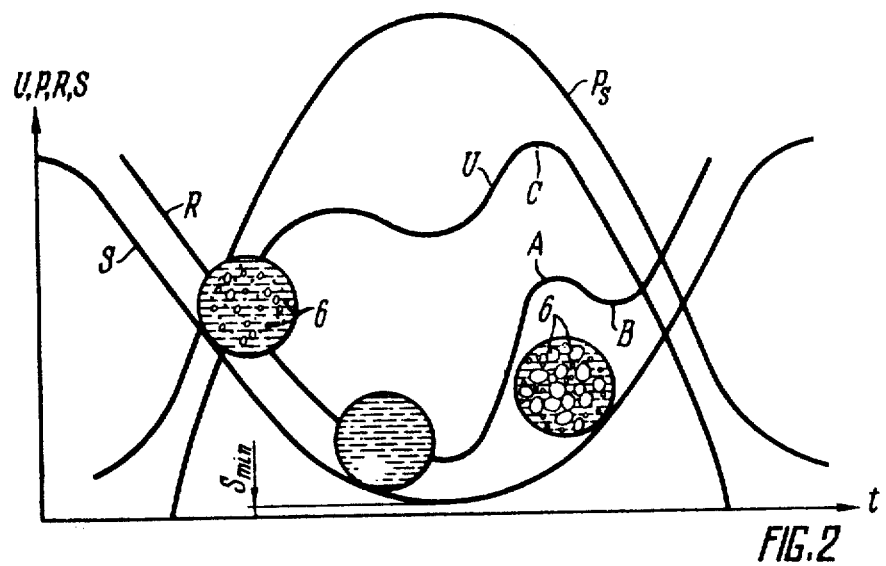
FIG. 2 is a time plot illustrating the measurement of process parameters as the tool is in oscillating motion in relation to the surface of the workpiece, in accordance with the invention.
Figure 3:
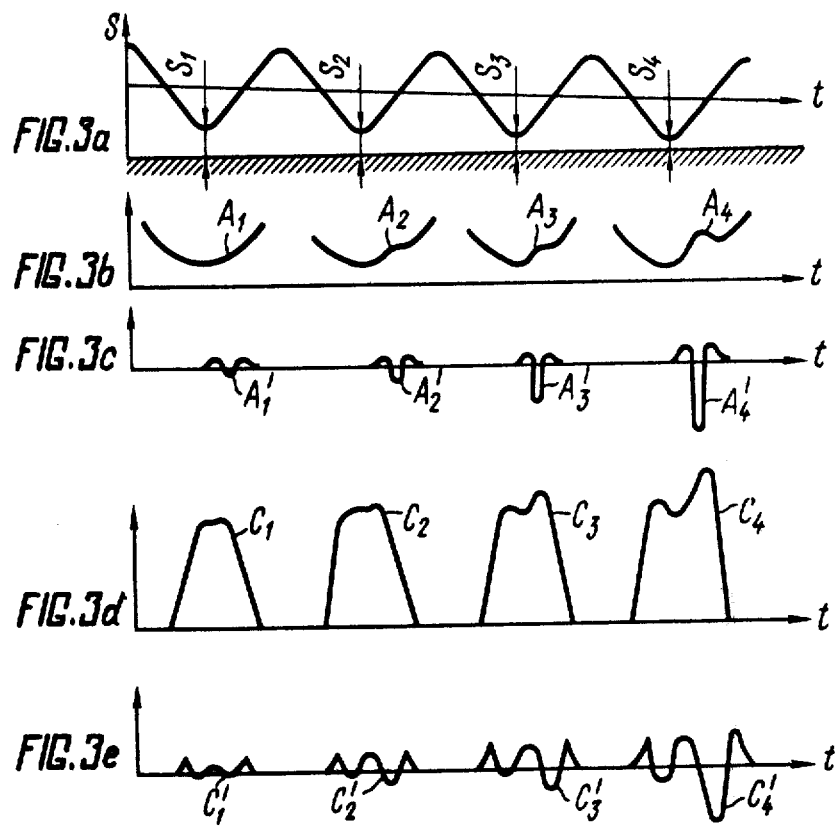
FIG. 3 shows time plots illustrating variations of relative parameters due to the cavitation, as the tool is brought away from the surface of the workpiece, against the minimum width of the interelectrode gap, in accordance with the invention.

In the course of the electrochemical working, the intensity of the formation of vapor-gas bubbles 6, due to cavitation as the tool 2 (FIG. 1) moves away from the workpiece 3, depends on the minimum width of the interelectrode gap, i.e. $S_{min}$ (FIG. 2) and on the flowrate of the electrolyte through the gap. The smaller the minimum interelectrode gap, i.e. $S_4 < S_1$ (FIG. 3a), the lower the flowrate of the electrolyte passing through the gap, and the faster the enrichment of the electrolyte in the interelectrode gap $S_4$ with the vapor-gas component. Thus a withdrawal of the tool 2 (FIG. 1) from the surface of the workpiece 3 is accompanied by an avalanche-like growth of vapor-gas bubbles 6 (FIG. 2) in the interelectrode gap $S_4$ (FIG. 3a). The result is a considerable increase of the resistance R (FIG. 3b)-portion $A_4$ of the interelectrode gap $S_4$.

Wide minimum interelectrode gaps $S_1$ (FIG. 3a) account for a situation when the intensity of the electrochemical processes is reduced and the electrolyte in the interelectrode gap $S_1$ is enriched with the vapor-gas component to a limited degree. Under such conditions, the formation of vapor-gas bubbles 6 (FIG. 2), due to the withdrawal of the tool electrode 2 (FIG. 1), is also limited. Finally, the change in the resistance R (FIG. 3b)-portion $A_1$, which is due to cavitation, is also limited, i.e. $A_1 < A_4$.

Thus the intensity of cavitation, which occurs as the tool 2 (FIG. 2) is withdrawn from the surface of the workpiece 3, depends on the width of the interelectrode gap S and the flowrate of the electrolyte through that gap.

The direct relationship between the intensity of cavitation and the minimum interelectrode gap width $S_{min}$ at a certain inlet pressure $P_1$ (FIG. 1) is used to control the electrochemical working.

As the tool 2 is withdrawn from the workpiece 3, while being in oscillating motion, there is a sharp increase in the resistance R (FIG. 2) of the interelectrode gap S; thus the control of the electrochemical working process makes it necessary to monitor the relative variation of the resistance of the interelectrode gap S, caused by cavitation in the electrolyte.

The relative resistance of the interelectrode gap is to be understood as the relation between the actual value of the resistance of the interelectrode gap S and its value with a minimum gap width $S_{min}$. The control carried out with reference to a relative parameter rules out the effects of variations of the area being worked, the temperature of the electrolyte, the conductivity of the electrolyte and other factors.

Prior to operation, the tool 2 and workpiece 3, which oscillate in relation to one the other, are brought till they come in contact with no voltage applied to them; then they are brought apart so that there is a predetermined minimum gap $S_{min}$ (FIG. 2) between them. The pulse working voltage U (FIG. 1) is then applied to the electrodes, whereas the electrolyte is fed to the interelectrode gap S under a pressure of $P_1$. At this point the electromechanical working proper starts.

The value of the predetermined minimum gap width, $S_{min}$ (FIG. 2), is unambiguously related to the cavitation intensity and, consequently, to the degree of variation of the relative resistance of the interelectrode gap. It is necessary therefore to record and store the maximum change of the relative resistance of the gap S (FIG. 1), which is due to cavitation; this value can further be used to set the working conditions which, in turn, are largely determined by the width of the gap S.

In case of a deviation of the relative resistance of the gap S from a prescribed value, one can vary the feedrate V (FIG. 1) and pressure $P_S$; if the actual value of the relative resistance is above the prescribed value, it is necessary to raise the pressure $P_S$ and reduce the feedrate V. If the actual value of the relative resistance is below the prescribed value, one raises the feedrate V.

The setting of a predetermined minimum interelectrode gap width $S_{min}$ (FIG. 2) is followed by measuring and storing the relative resistance of the gap S at a moment when the cavitation intensity is at its highest point. All these operations are performed periodically at intervals of a few tens of minutes. Such long intervals are due to a relatively slow change in the area being worked, as well as in the temperature and conductivity of the electrolyte.

According to FIG. 3b, a change of the minimum interelectrode gap width $S_{min}$ (FIG. 2) leads to an increase of the local extremum of the relative resistance of the gap S (FIG. 1) as the electrodes are brought apart (position $A_1 \div A_4$).

As the electrodes are brought apart, the distortion of the relative resistance curve due to the cavitation phenomena manifests itself by the appearance of the local extremum whose value is lower than that of the relative resistance with the electrodes being quite far apart. As a result, it is difficult to compare the actual value of the relative resistance with the prescribed value, keeping in mind that the comparison has to be made only when the cavitation intensity is at its highest.

It is therefore suggested that the process be controlled by varying the second derivative of the relative resistance of the interelectrode gap S (FIG. 1).

The value of a second derivative of a function is proportional to the curvature of the function at a given point; the intensity of cavitation manifests itself in the value of the local extremum on the curve of the relative resistance of the interelectrode gap S; the degree of curvature of the local extremum pack increases with an increase in the cavitation intensity; the foregoing considerations suggest that one can use the amplitude comparison technique and thus easily find the difference between the actual value of the parameter and its prescribed value, keeping in mind that in the case of double differentiation, the change in the cavitation intensity manifests itself in a change in the amplitude of the global extremum on the curve (FIG. 3c). The curve of FIG. 3c presents values of the second derivative of the relative resistance of the interelectrode gap; it shows that the amplitude of pulses $A_1{}^1 \div A_4{}^1$, which are global extremums, increases with a change of the minimum interelectrode gap width $S_{min}$ (FIG. 2).

When the process of electrochemical working is controlled with the use of a power source 1 (FIG. 1) operating over the dropping portion of the volt-ampere characteristic, one measures the change of the relative voltage across the electrodes, which is due to cavitation in the electrolyte, with the electrodes brought apart.

The term "relative voltage" is to be understood as the ratio between the actual value of voltage across the electrodes and its value with a minimum gap width $S_{min}$ (FIG. 2). The control with reference to relative parameters rules out errors which may be due to variations of the voltage of the power source 1 (FIG. 1), the temperature of the electrolyte, the area being worked, etc.

When power is supplied to a load from a power source, the voltage across the load is known to be proportional to its resistance. This means that the shape of voltage pulses U across the electrodes may change depending on the cavitation intensity. According to FIG. 3d, a reduced minimum interelectrode gap width $S_{min}$ (FIG. 2) accounts for a growth of the local extremum, $C_1 \div C_4$ (FIG. 3d) on the curve representing the change of the relative voltage across the electrodes.

The accuracy of measuring the change of the local extremum on the curve representing the change of the relative voltage, which determines the cavitation intensity, can be improved by using the value of the second derivative of the relative voltage as the information parameter; this, in turn, accounts for an improved accuracy of controlling the process of electrochemical working.

According to FIG. 3e, a decrease of the minimum interelectrode gap width $S_{min}$ (FIG. 2) is accompanied by an increase of the amplitude $C_1{}^1 \div C_4{}^1$ of the global extremum on the second derivative curve.

The present invention is further concerned with a system for electrochemical working, which comprises a cavitation transducer 7 (FIG. 4) connected to the tool electrode 2 and the workpiece 3. The cavitation transducer 7 has its output electrically coupled to an input 8 of a working conditions control device 9. The tool 2 and workpiece 3 are connected to output buses of the pulsed power source 1.

The working conditions control device 9 comprises a unit 10 for selecting and storing the cavitation parameter value with a minimum interelectrode gap width $S_{min}$ (FIG. 2). The unit 10 has its output connected to an input 11 (FIG. 4) of a unit 12 for calculating the relative value of the cavitation parameter function. An input 13 of the unit 12 and an input 14 of the unit 10 are electrically connected to the output of the cavitation transducer 7. The unit 12 for calculating the relative value of the cavitation parameter function is connected to an input 15 of a unit 16 for selecting and storing the relative value of the cavitation parameter function and to an input 17 of a unit 18 for comparing the actual relative value of the cavitation parameter function with a predetermined value. An input 19 of the comparator 18 is connected to the output of the selection and storage unit 16. The output of the comparator 18 is connected to an input 20 of an inhibit circuit 21 whose output serves as the output of the working conditions control device 9 and is connected to an actuator 22.

Control inputs 23, 24 and 25, 26 of the selection and storage units 10 and 16, respectively, and a control input 27 of the inhibit circuit 21 are connected to a time control unit 28.

Figure 5:
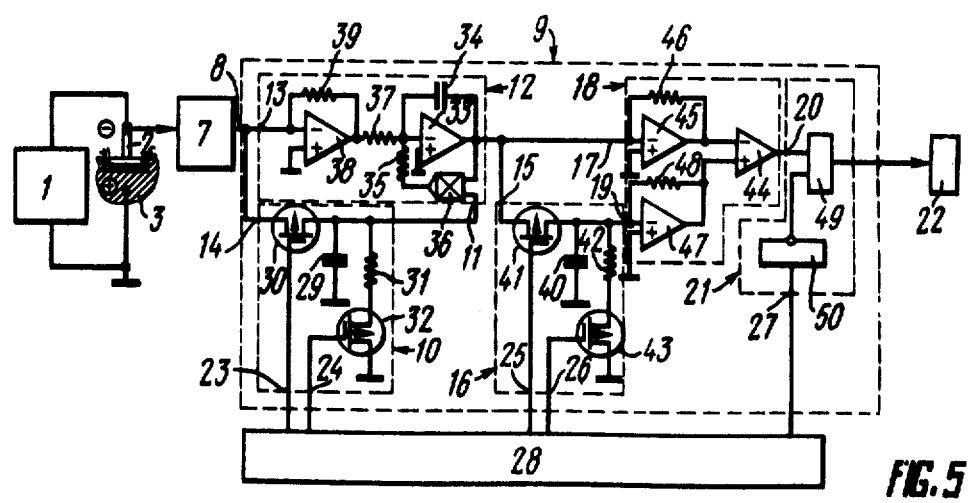
FIG. 5 is a functional diagram of an electrochemical working system in accordance with the invention.

The unit 10 (FIG. 5) for selecting and storing the cavitation parameter with a minimum interelectrode gap width $S_{min}$ (FIG. 2) is built around a storage capacitor 29 (FIG. 5). One plate of the capacitor 29 is grounded; its second plate is connected via a MOS-FET transistor 30 to the input 14 of the selection and storage unit 10 and to the input 11 of the unit 12 for calculating the relative value of the cavitation parameter function, further referred to as the computing unit. The discharge circuit of the storage capacitor 29 comprises a resistor 31 having one of its leads connected to the non-grounded plate of the capacitor 29. The second lead of the resistor 31 is grounded through a MOS transistor 32. The transistors 30 and 32 have their control inputs connected to the control inputs 23 and 24 of the selection and storage unit 10.

The unit 12 for calculating the relative value of the cavitation parameter function comprises a divider which includes, in turn, an operational amplifier 33 whose inverting input is connected to its output via a capacitor 34. The inverting input of the operational amplifier 33 is connected via an adding resistor 35 to a functional generator 36; through an adding resistor 37, it is also connected to the output of an operational amplifier 38. The output of the operational amplifier 38 is connected to the input 17 of the comparator 18 and to the input 15 of the selection and storage unit 16. The inverting input of the operational amplifier 38 is connected to the input 13 of the computing unit 12 and, via a resistor 39, to the output of said amplifier 38. The functional generator 36 is intended for multiplying two variables; it has its first input connected to the output of the operational amplifier 33 and its second input connected to the input 11 of the computing unit 12. The non-inverting inputs of the operational amplifiers 33 and 38 are grounded.

The unit 16 for selecting and storing the relative value of the cavitation parameter function is built around a storage capacitor 40. One plate of the capacitor 40 is grounded, while its second plate is connected via a MOS-FET transistor 41 to the input 15 of the selection and storage unit 16 and to the input 19 of the comparator 18. The discharge circuit of the storage capacitor 40 comprises a resistor 42 whose first lead is connected to the non-grounded plate of the capacitor 40. The second lead of the resistor 42 is grounded through a MOS transistor 43. The transistors 41 and 43 have their control inputs connected to the control inputs 25 and 26, respectively, of the selection and storage unit 16.

The unit 18 for comparing the actual relative value of the cavitation parameter function with a predetermined value is built around a differential operational amplifier 44 whose output serves as the output of the comparator 18 and is connected to the input 20 of the inhibit circuit 21. The operational amplifier 44 has its inverting input connected to the output of an operational amplifier 45 whose inverting input is connected to the input 17 of the comparator 18 and, via a resistor 46, to the output of said operational amplifier 44. The non-inverting input of the amplifier 44 is connected to the output of an operational amplifier 47 whereof the inverting input is connected to the input 19 of the comparator 18 and, via a resistor 48, to the output of said operational amplifier 47. The non-inverting inputs of the amplifiers 45 and 47 are grounded.

The inhibit circuit 21 comprises an AND gate 49 having its first input connected to the input 20 of the inhibit circuit 21 and its second input connected via an inverter 50 to the control input 27 of the inhibit circuit 21. The output of the AND gate 49 serves as the output of the working conditions control device 9 and is connected to the actuator 22.

Figure 6:
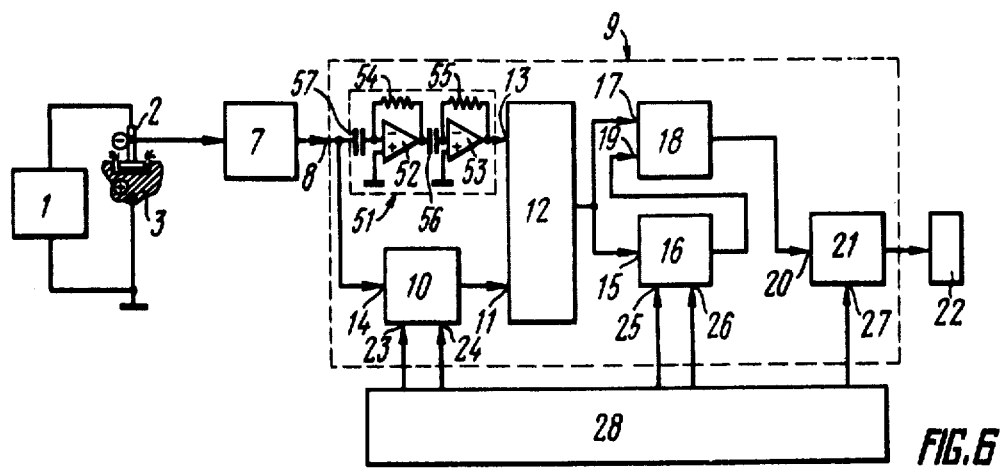
FIG. 6 is a diagram of an electrochemical working system in accordance with the invention, including a second-order differentiation unit.

A second-order differentiation unit 51 (FIG. 6) comprises operational amplifiers 52 and 53 placed in series, their inverting inputs having negative feedback loops comprising resistors 54 and 55. The output of the operational amplifier 53 serves as the output of the differentiator 51 and is connected to the input 13 of the computing unit 12; the inverting input of said operational amplifier 53 is connected via a differentiating capacitor 56 to the output of the operational amplifier 52. The inverting input of the amplifier 52 is connected via a differentiating capacitor 57 to the input 8 of the working conditions control device 9 and to the input 14 of the selection and storage unit 10. The non-inverting inputs of the operational amplifiers 52 and 53 are grounded.

Figure 7:
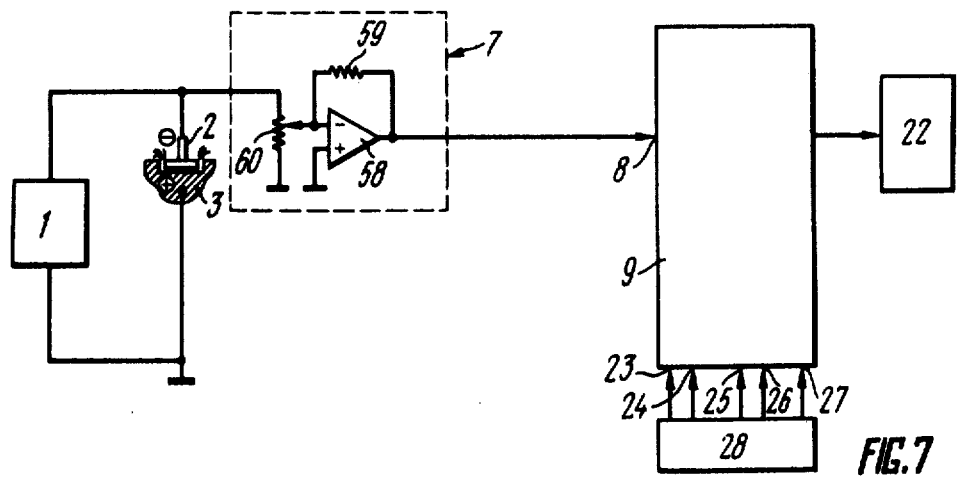
FIG. 7 is a diagram of a cavitation transducer in accordance with the invention.

The cavitation transducer 7 (FIG. 7) is a voltage sensor built around an operational amplifier 58 having a negative feed-back loop for its inverting input, comprising a resistor 59. The output of the operational amplifier 58 is connected to the input 8 of the working conditions control device 9; the inverting input of said operational amplifier 58 is connected to the central tap of a potentiometer 60. The latter has its first load grounded; its second lead is connected to the tool electrode 2 whereto a negative potential is applied.

According to an alternative embodiment, the cavitation transducer 7 (FIG. 8) comprises a resistance calculating unit 61 whose output serves as the output of the cavitation transducer 7 and is connected to the input 8 of the working conditions control device 9. An input 61 of the resistance calculating unit 61 is connected to the output of a voltage sensor 63 whose input is connected to the tool electrode 2 whereto a negative potential is applied. An input 64 of the unit 61 is connected to the output of a current sensor 65.

The voltage sensor 63 is built around an operational amplifier 66 having a negative feedback loop for its non-inverting input, comprising a resistor 67. The output of the operational amplifier 66 is connected to the input 62 of the resistance calculating unit 61; the inverting input of said operational amplifier 66 is connected to the central tap of a potentiometer 68. The latter has its first output grounded, whereas its second output is connected to the tool electrode 2 whereto a negative potential is applied. The inverting input of the operational amplifier 66 is grounded.

The current sensor 65 comprises an operational amplifier 69 having a negative feedback loop for its non-inverting input, comprising a resistor 70. The output of the amplifier 69 is connected to the input 64 of the resistance calculating unit 61; the inverting input of said operational amplifier 69 is connected to the central tap of a potentiometer 71 whose leads are placed in parallel with the output winding of a transformer 72, which winding is shorted against a resistor 73. The inverting input of the amplifier 69 and one lead of the potentiometer 71 are grounded.

The differentiator 61 is built around an operational amplifier; an integrating capacitor 75 provides a capacitive feedback loop for the inverting input of said amplifier 74. The output of the amplifier 74 serves as the output of the cavitation transducer 7. The inverting input of the amplifier 74 is connected via an adding resistor 76 to the output of a functional generator 77 and to one lead of a resistor 78 whereof the second lead is connected to the input 62 of the unit 61. One input of the functional generator 77 serves as the input 64 of the unit 61; the second input of the functional generator 77 is connected to the output of the amplifier 74.

The reference numerals of FIG. 9 designate the following:

79 is a curve representing the change with time of the width of the interelectrode gap S (FIG. 1);

80 is the predetermined level of the change of the relative voltage across the electrodes;

81 is a curve representing the change of the relative voltage across the electrodes;

82 is a curve representing the change of the second derivative of the relative voltage across the electrodes;

83 is the predetermined level of the change of the second derivative of the relative voltage across the electrodes.

The reference numerals of FIG. 10 designate the following:

84 is a curve representing the change with time of the width of the interelectrode gap S (FIG. 1);

85 is the predetermined level of the change of the relative voltage across the electrodes;

86 is a curve representing the change of the relative voltage across the electrodes;

87 is a curve representing the change of the second derivative of the relative voltage across the electrodes;

88 is the predetermined level of the change of the second derivative of the relative voltage across the electrodes;

89 and 90 represent the output signal of the inhibit circuit 21 (FIG. 5).

All the curves of FIG. 10 correspond to a minimum interelectrode gap width, $S''_{min}$, which is less than that of FIG. 9, i.e. $S''_{min} < S'_{min}$.

The reference numerals of FIG. 11 designate the following:

91 is a curve representing the change with time of the width of the interelectrode gap (FIG. 2);

92 is a voltage curve;

93 is a curve representing the change of the current through the interelectrode gap S (FIG. 1);

94 is a curve representing the change of the relative resistance of the interelectrode gap;

95 is the predetermined level of the change of the relative resistance of the interelectrode gap S (FIG. 1);

96 is a curve representing the change of the second derivative of the relative resistance of the interelectrode gap S (FIG. 1);

97 is the predetermined level of the change of the second derivative of the relative resistance of the interelectrode gap S (FIG. 1).

The reference numerals of FIG. 12 designate the following:

98 is a curve representing the change with time of the width of the interelectrode gap S (FIG. 1);

99 is a curve representing the change of voltage across the electrodes;

100 is a curve representing the change of current through the interelectrode gap S (FIG. 1);

101 is a curve representing the change of the relative resistance of the interelectrode gap S (FIG. 1);

102 is the predetermined level of the change of the relative resistance of the interelectrode gap S (FIG. 1);

103 is a curve representing the change of the second derivative of the relative resistance of the interelectrode gap S (FIG. 1);

104 is the predetermined level of the change of the second derivative of the relative resistance of the interelectrode gap S (FIG. 1);

105 and 106 designate the output signal of the inhibit circuit 21 (FIG. 5).

Figures 13, 14:
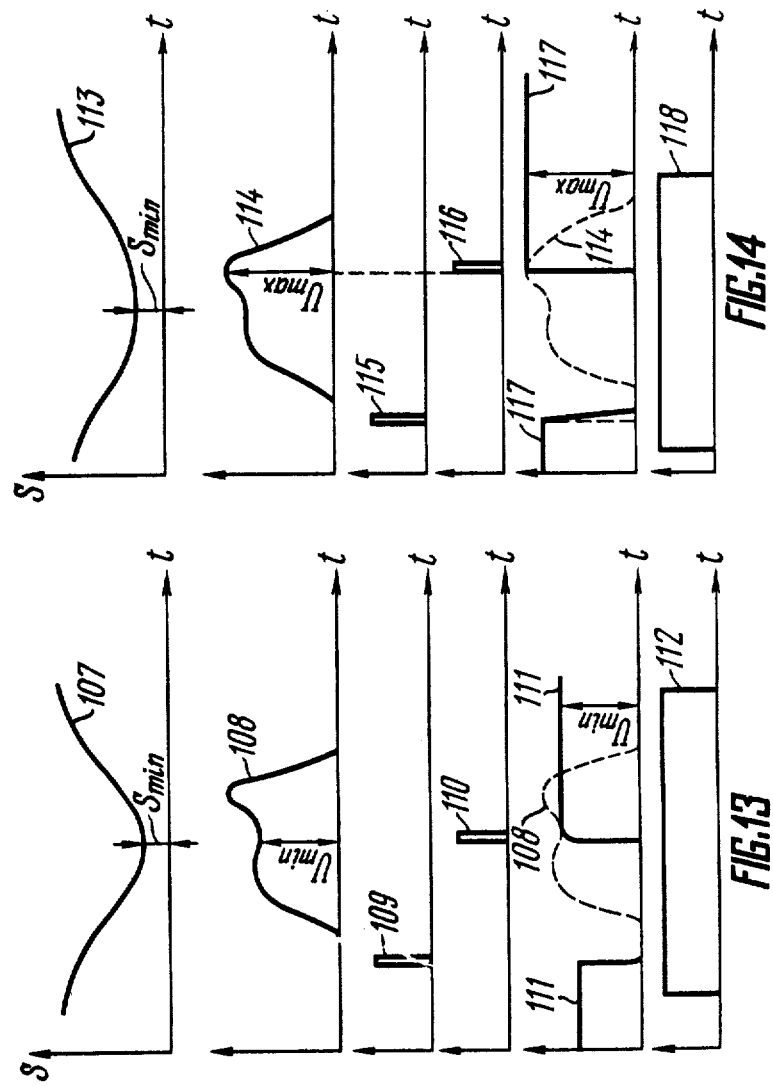
FIG. 13 is a diagram illustrating operation of the unit for selecting and storing the cavitation parameter with a minimum interelectrode gap width, in accordance with the invention.
FIG. 14 is a diagram illustrating operation of the unit for selecting and storing the relative value of the cavitation parameter function, in accordance with the invention.

The reference numerals of FIG. 13 designate the following:

107 is a curve representing the change with time of the width of the interelectrode gap S (FIG. 1);

108 is a curve representing the change of voltage across the electrodes, where $U_{min}$ is voltage with a minimum gap $S_{min}$ (FIG. 2);

109 designates a control signal applied to the control input 24 (FIG. 5) of the selection and storage unit 10;

110 designates a control signal applied to the control input 23 (FIG. 5) of the selection and storage unit 10;

111 is voltage across the storage capacitor 29 (FIG. 5) of the selection and storage unit 10;

112 is a control signal at the input 27 (FIG. 5) of the inhibit circuit 21.

The reference numerals of FIG. 14 designate the following:

113 is a curve representing the change with time of the width of the interelectrode gap S (FIG. 1);

114 is a curve representing the change of the relative voltage across the electrodes, where $U_{max}$ is a maximum relative voltage;

115 is a control signal applied to the control input 26 (FIG. 5) of the selection and storage unit 16;

116 is a control signal applied to the control input 25 (FIG. 5) of the selection and storage unit 16;

117 is voltage across the storage capacitor 40 (FIG. 5) of the selection and storage unit 16;

118 is a control signal at the input 27 (FIG. 5) of the inhibit circuit 21.

Prior to operation, the tool electrode 2 and workpiece 3, which oscillate in relation to one the other, are brought together until they come into contact with no voltage applied thereto. The electrodes are then brought apart so that there is a predetermined minimum interelectrode gap $S_{min}$ between them (FIG. 2). A voltage pulse U (FIG. 1) is then applied to the electrodes; as this takes place, the pressure of the electrolyte at the inlet of the interelectrode gap S is $P_1$. This point is the start of the electrochemical working.

At a given pressure $P_1$ of the electrolyte and as the tool electrode 2 is withdrawn, while being in oscillating motion, the cavitation intensity is unambiguously determined by a specified minimum width of the interelectrode gap, $S_{min}$ (FIG. 2). At the start of operation, the cavitation transducer 7 (FIG. 4) is used to measure a parameter which unambiguously determines the cavitation intensity corresponding to the minimum width of the interelectrode gap S (FIG. 2).

In order to exclude the effects of possible variations of the output voltage of the power source 1 (FIG. 4), the electrolyte temperature and the area of the workpiece 3, the signal produced by the cavitation transducer 7 is applied to the input 13 of the unit 12 which calculates the relative value of the cavitation parameter function, which is done by dividing the actual value of the cavitation parameter by the value of the same parameter measured with the minimum interelectrode gap width $S_{min}$ (FIG. 2).

Figure 4:
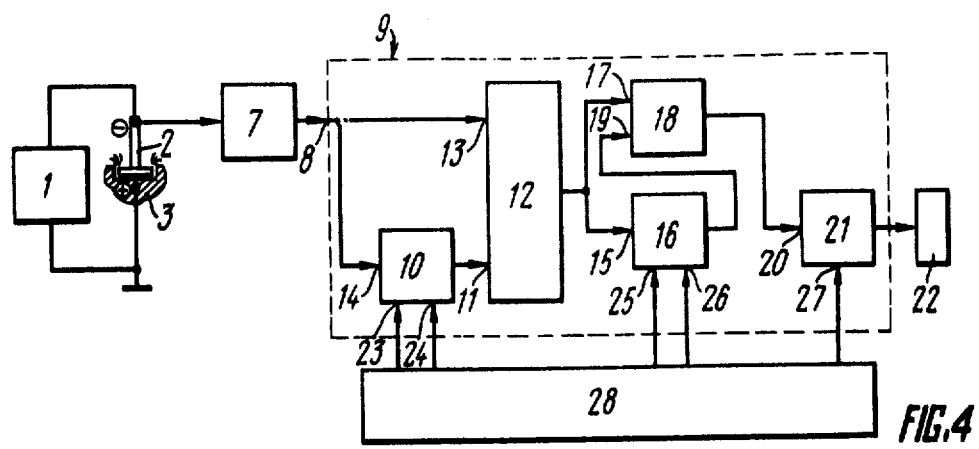
FIG. 4 is a block diagram of an electrochemical working system in accordance with the invention.

The measurement of the cavitation parameter value with the minimum interelectrode gap $S_{min}$ is effected by the selection and storage unit 10 (FIG. 4). The unit 10, whereof the input 14 is connected to the output of the cavitation transducer 7, is an analog storage device which stores, over a preset period of time, the actual value of the cavitation parameter with the minimum interelectrode gap $S_{min}$ (FIG. 2). The output signal of the selection and storage unit 10 (FIG. 4) is applied to the input 11 of the computing unit 12 at whose output there is produced a signal which is proportional to the relative value of the cavitation parameter function. The magnitude of this signal is directly dependent on the minimum interelectrode gap width $S_{min}$ (FIG. 2) adjusted prior to operation. This signal is stored by the selection and storage unit 16 (FIG. 4) and is used, over a certain period of time, as a prescribed value. The selection and storage unit 16 is an analog storage device.

Thus the start of the electrochemical working includes the operations of calculating and storing the predetermined relative value of the cavitation parameter function, which corresponds to the predetermined minimum interelectrode gap width $S_{min}$ (FIG. 2).

Then, from the time control unit 28 to the input 27 (FIG. 4) of the inhibit circuit 21 there is sent a signal whereby no signal can reach the actuator 22. The idea is to prevent the passage of spurious signals which may be caused by the commutation of the selection and storage units 10 and 16 during the storage cycle. At the end of the cycle, the inhibit signal is removed.

At the end of the initial stage of the electrochemical working, when the units 10 and 16 have stored the values of the signals determining the operating conditions, the comparator 18, whereof the first input 17 is connected to the output of the computing unit 12 and the second input 19 is connected to the output of the selection and storage unit 16, compares the signal corresponding to the actual relative value of the cavitation parameter function with the signal corresponding to the prescribed value.

If the actual value of the cavitation parameter function is below the prescribed value, the comparator 18 produces a signal whereby the actuator 22 increases the feedrate V (FIG. 1) of the tool electrode 2. If the actual value of the cavitation parameter function is above the prescribed value, the comparator 18 (FIG. 4) produces a signal whereby the actuator 22 reduces the feedrate V (FIG. 1) and raises the pressure $P_1$ at the inlet of the interelectrode gap S.

The setting of a predetermined minimum interelectrode gap width $S_{min}$ (FIG. 2) is followed by measuring and storing the predetermined relative value of the cavitation parameter function, which is directly related to the gap S (FIG. 1). These operations are performed periodically at intervals of 5 to 10 minutes, or even at longer intervals, keeping in mind that the cutting speed of the tool 2 is relatively low.

The cavitation parameter with a minimum interelectrode gap width $S_{min}$ (FIG. 2) is measured and stored once over a period of time during which the electrode performs 5 to 10 oscillations.

The working conditions control device 9 (FIG. 4) operates in conjunction with the time control unit 28 which sends control signals 109, 110, 112 (FIG. 13) and 115, 116, 118 (FIG. 14) to the selection and storage units 10 and 16 (FIG. 4) and the inhibit circuit 22.

Consider now the following detailed description of operation of units and circuits incorporated in the working conditions control device 9 (FIG. 5).

The output signal of the cavitation transducer 7, corresponding to the cavitation parameter value, is applied to the input of the selection and storage unit 10: when the intereloctrode gap is at its minimum, i.e. equal to $S_{min}$ (FIG. 2), the transistor 30 is driven into conduction for a short period of time to charge the storage capacitor 29 (FIG. 5) which stores, over a period of time during which the tool electrode 2 performs a few oscillations, the value of voltage corresponding to the value of the cavitation parameter with the minimum interelectrode gap width $S_{min}$ (FIG. 2).

As the transistor 32 is driven into conduction for a short period of time, the capacitor 29 discharges through the resistor 31.

The process of selecting and storing the cavitation parameter is represented in FIG. 13 by curves 107, 108, 109, 110, 111 and 112 for cases when the cavitation parameter is the voltage across the electrodes.

Output signals of the cavitation transducer 7 (FIG. 5) and the selection and storage unit 10 are applied to the inputs 13 and 11 of the unit 12 for calculating the relative value of the cavitation parameter function. The unit 12 is a divider which performs the operation Z=X/Y by solving the differential equation $Z' = -K[ZY-X]$, $Z(O)=0$. The variable X corresponds to the signal applied to the input 13 of the unit 12; the variable Y corresponds to the signal applied to the input 11 of the unit 12; the variable Z corresponds to the output signal of the unit 12.

The function of the integrator and adder is performed by the operational amplifier 33 having a capacitive feedback with the adding resistors 35 and 37.

The amplifier 38 performs the function of inverting the variable X. The functional generator 36 is intended to multiply the variables Z and Y and may incorporate any standrard analog circuitry; it may incorporate, for example, logarithmic amplifiers or other similar units; this equally applies to the entire unit 12.

From the output of the unit 12, the signal which corresponds to the relative value of the cavitation parameter function, is applied to the unit 16 for selecting and storing the predetermined relative value of the cavitation parameter function. Operation of the unit 16 is similar to that of the unit 10, which is described above. Operation of the unit 16 is represented in FIG. 14 by curves 113, 114, 115, 116, 117 and 118 for the case when the cavitation parameter is voltage across the electrodes.

Unlike the unit 10 (FIG. 5), the storage capacitor 40 discharges when the change of the resistance R (FIG. 2) of the interelectrode gap S, caused by the cavitation, is at its highest point.

The comparator 18 (FIG. 5) is intended to compare the actual relative value of the cavitation parameter with a predetermined value. The comparator 18 is built around the differential operational amplifier 44 whose inputs receive signals applied thereto from the outputs of the units 12 and 16 via the inverting amplifiers 45 and 47.

The comparison signal is a positive potential at the output of the comparator 18. This signal is applied via the AND gate 49 to the actuator 22, which takes place only in the absence of an inhibit signal produced by the time control unit 28 and applied to the input 27 of the inhibit circuit 21, i.e. to the inverter 50.

As the tool electrode 2 is in oscillating motion, the cavitation is accompanied by a rapid increase of the resistance R (FIG. 2) of the interelectrode gap S (FIG. 1). According to the method of this invention, one of the parameters which helps to determined the cavitation intensity is the change of the resistance of the interelectrode gap S due to cavitation.

Figure 8:
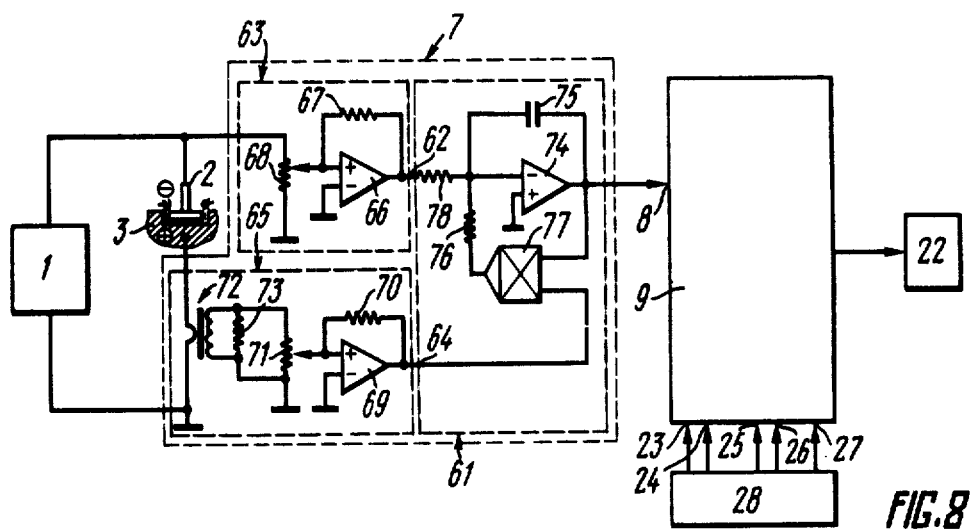
FIG. 8 is a diagram of an alternative embodiment of the cavitation transducer in accordance with the invention.

The cavitation transducer 7 (FIG. 8 measures the resistance of the interelectrode gap S (FIG. 1) by what is known as the ammeter-voltmeter technique. According to the embodiment of FIG. 8, the cavitation transducer 7 comprises the voltage sensor 63 and current sensor 65 whose output signals are applied to the inputs 62 and 64 of the resistance calculating unit 61 which is a divider.

The voltage sensor 63 comprises the potentiometer 68. From the central tap of the potentiometer 68, voltage is applied via the separation non-inverting amplifier 66 to the input 62 of the unit 61.

The current sensor 65 comprises the current transformer 72 whose output voltage is applied via the potentiometer 71 and separation non-inverting amplifier 69 to the input 64 of the unit 61.

The circuitry and operation of the resistance calculating unit 61 are similar to those of the unit 12 (FIG. 4) which is described above. At the output of the unit 61, there is produced a signal which is proportional to the actual value of the resistance of the interelectrode gap S (FIG. 1).

Curves 91, 92, 93, 94 and 95 of FIG. 11 represent the change of voltage, current and relative resistance of the interelectrode gap S (FIG. 1) for the case when the minimum gap $S'_{mm}$ (FIG. 11) is too wide for cavitation to develop. As the gap is reduced to $S''_{mm}$ (FIG. 12) and as the cavitation develops (curves 98, 99, 100, 101, 102 and 105) with the tool electrode 2 withdrawn from the workpiece 3 (FIG. 1), the shape of curve 101 (FIG. 12) is different from that of original curve 94 (FIG. 9), which is due to the change of the relative resistance because of the cavitation, which is measured by bringing into play the comparator 18 (FIG. 5) which compares the actual value of the relative resistance of the interelectrode gap S (FIG. 1) at a moment the cavitation intensity is at its highest with the predetermined value (curve 102 of FIG. 12) stored by the unit 16, which predetermined value is obtained at the very start of operation, following the last cycle of setting the interelectrode gap S (FIG. 1).

The shape of curves 99 and 100 (FIG. 12) corresponds to the case when the power source 1 (FIG. 1) possesses a rigid volt-ampere characteristic.

With the power source 1 operating over the dropping portion of the volt-ampere characteristic, the function of the cavitation sensor 7 (FIG. 7) can be performed, for example, by a voltage sensor built around the potentiometer 60. From the central tap of the potentiometer 60, voltage is applied via the inverting amplifier 58 to the input 8 of the working conditions control device 9. When power is fed to a load from a current source, voltage across the load is known to be proportional to its resistance. This means that the shape of the voltage pulse U (FIG. 1) across the tool electrode 2 and workpiece 3 is dependent on the intensity of cavitation.

A comparison of the shapes of curves 81 (FIG. 9) and 86 (FIG. 10) with different minimum gap widths $S_{min}$ (curves 79 of FIG. 9 and 84 of FIG. 10) shows a relative voltage peak on curve 86 (FIG. 10) which is due to the development of cavitation following a withdrawal of the tool electrode 2 (FIG. 1). A comparison with the predetermined level 83 (FIG. 10) produces a signal at the output of the inhibit circuit 21 (FIG. 5), whereby the actuator 22 is brought into play.

The distortion of the shape of curves representing the relative voltage across the electrodes and the relative voltage of the gap S (FIG. 1) due to cavitation is manifested by a local extremum at the right-hand portion of the curves; the extremum is indicative of a withdrawal of the tool electrode 2 (curves 86 of FIG. 10 and 101 of FIG. 12). It is hard to register the extremums by resorting to the amplitude technique, because it necessitates the gating of the comparator at a moment the cavitation intensity is at its highest.

In order to improve the accuracy of measuring the cavitation intensity by measuring the relative values of local extremums of the voltage curves and the resistance of the interelectrode gap S (FIG. 1), the device 9 includes the the second-order differentiation unit 51 interposed between the input 8 of said device 9 and the input 13 of the unit 12. Applied to the unit 51 from the output of the cavitation transducer 7 is a signal which is either voltage or resistance of the interelectrode gap S (FIG. 1); the signal is differentiated by the serially connected differentiating amplifiers 52 and 53 and is applied to the input of the unit 12 for calculating the relative value of the signal.

The value of the second derivative of a function is proportional to the curvature of the function at a given point; the cavitation intensity manifests itself by a local extremum on the relative voltage or resistance curve; the curvature of the extremum increases with an increase in the cavitation intensity; thus one can use the comparator 18 for amplitude comparison of the actual value of the second derivative of the relative voltage or resistance with a predetermined value, whereby a signal is produced to control the actuator 22.

FIGS. 9 and 10 represent the relation between the shape of the curve of the second derivative of the relative voltage and the minimum gap widths $S'_{min}$ and $S''_{min}$ (curves 82, 83, 87, 88 and 90).

Curves 88 and 89 of FIG. 11 and curves 97, 95, and 96 of FIG. 12 represent the relation between the shape of the curve of the second derivative of the relative resistance and the minimum interelectrode gap widths $S'_{min}$ and $S''_{min}$ (curves 96, 97, 103,104 and 105).

The distortion of the shape of the second derivative curve because of cavitation manifests itself by a global extremum as the tool electrode 2 (FIG. 1) is withdrawn from the workpiece 3, which provides for simple and accurate measurements of the cavitation intensity and thus makes it possible to accurately maintain prescribed working conditions.

The electrochemical working method and system according to the present invention provide for an accuracy of up to 0.02 mm of copying and broaching operations on hard-to-work articles of complex configurations. The surface finish is as good as 0.1 mu with a working rate of 0.8 mm per minute.

The high accuracy makes it possible, for all practical purposes, to dispense with all problems involved in the calculation and adjustment of the tool electrode 2. Once the tool electrode 2 is prepared, it can be used to work a large batch of parts with a tolerance of not more than 0.02 mm.

This is due to the fact that the tool electrode is set in oscillating motion in the feed direction, which motion is synchronized with voltage pulses.

A proper combination of properties of the electrolyte and optimum oscillation parameters of the tool electrode 2, and the use of the adaptive control system account for effective and accurate working with gaps as small as 0.02 to 0.05 mm without damaging the tool electrode or the workpiece and at a low pressure $P_1$ of the electrolyte at the inlet of the interelectrode gap S.

What is claimed is:

1. An electrochemical working system involving the use of electrodes and comprising:
   a cavitation transducer connected to said electrodes; an output of said cavitation transducer;
   a time control unit having outputs;
   an actuator;
   a working conditions control unit having an input and an output;
   a unit for selecting and storing the cavitation parameter value with a minimum gap between said electrodes, incorporated in said working conditions control unit; an input, control inputs and an output of said unit for selecting and storing the cavitation parameter value with a minimum gap between said electrodes; said input being electrically connected to said output of said cavitation transducer; said control inputs being connected to said outputs of said time control unit;
   a unit for calculating the relative value of the cavitation parameter function of said working conditions control unit, having a first input, a second input and an output; said first input being electrically connected to said output of said cavitation transducer; said second input being connected to said output of said unit for selecting and storing the cavitation parameter value with a minimum gap between said electrodes;
   a unit for selecting and storing the relative value of the cavitation parameter function of said working conditions controlled device, having an input, an output and control inputs, said input being connected to said output of said unit for calculating the relative value of the cavitation parameter function; said control inputs being connected to said outputs of said time control unit;

a unit for comparing the actual relative value of the cavitation parameter function with a predetermined value of said working conditions control device, having a first input, a second input and an output; said first input being connected to said output of said unit for calculating the relative value of the cavitation parameter function; said second input being connected to said output of said unit for selecting and storing the relative of the cavitation parameter function;

an inhibit circuit of said working conditions control device including an input, a control input and an output said input being connected to said output of said unit for comparing the actual relative value of the cavitation parameter function with a predetermined value said output serving as said output of said working conditions control device and being connected to said actuator; said control input being connected to one of said outputs of said time control unit.

2. An electrochemical working system as claimed in claim 1, wherein such working conditions control device includes a second-order differentiation unit having an input and an output; said input being connected to said cavitation transducer; said output being connected to said second input of said unit for calculating the relative value of the cavitation parameter function. input, a second input and an output; said outputs of said voltage and current sensors being connected to said first and second inputs of said unit for calculating the resistance of said gap between said electrodes; said output being said output of said cavitation transducer.

3. An electrochemical working system as claimed in claim 2, wherein said cavitation transducer is a voltage sensor.

4. An electrochemical working system as claimed in claim 2, comprising:

a voltage sensor of said cavitation transducer, having an output;

a current sensor of said cavitation transducer, having an output;

a unit for calculating the resistance of said gap between said electrodes of said cavitation transducer, having a first input, a second input and an output; said outputs of said voltage and current sensors being connected to said first and second inputs of said unit for calculating the resistance of said gap between said electrodes; said output being said output of said cavitation transducer.

5. An electrochemical working system as claimed in claim 1, wherein said cavitation transducer is a voltage sensor.

6. An electrochemical working system as claimed in claim 1, comprising:

a voltage sensor of said cavitation transducer, having an output;

a current sensor of said cavitation transducer, having an output;

a unit for calculating the resistance of said gap between said electrodes of said cavitation transducer, having a first input, a second input and an output; said outputs of said voltage and current sensors being connected to said first and second inputs of said unit for calculating the resistance of said gap between said electrodes; said output being said output of said cavitation transducer.

* * * * *